Dec. 15, 1925.  
W. J. GROTENHUIS  
AUTOMOBILE BUMPER  
Filed June 11, 1925  
1,565,273
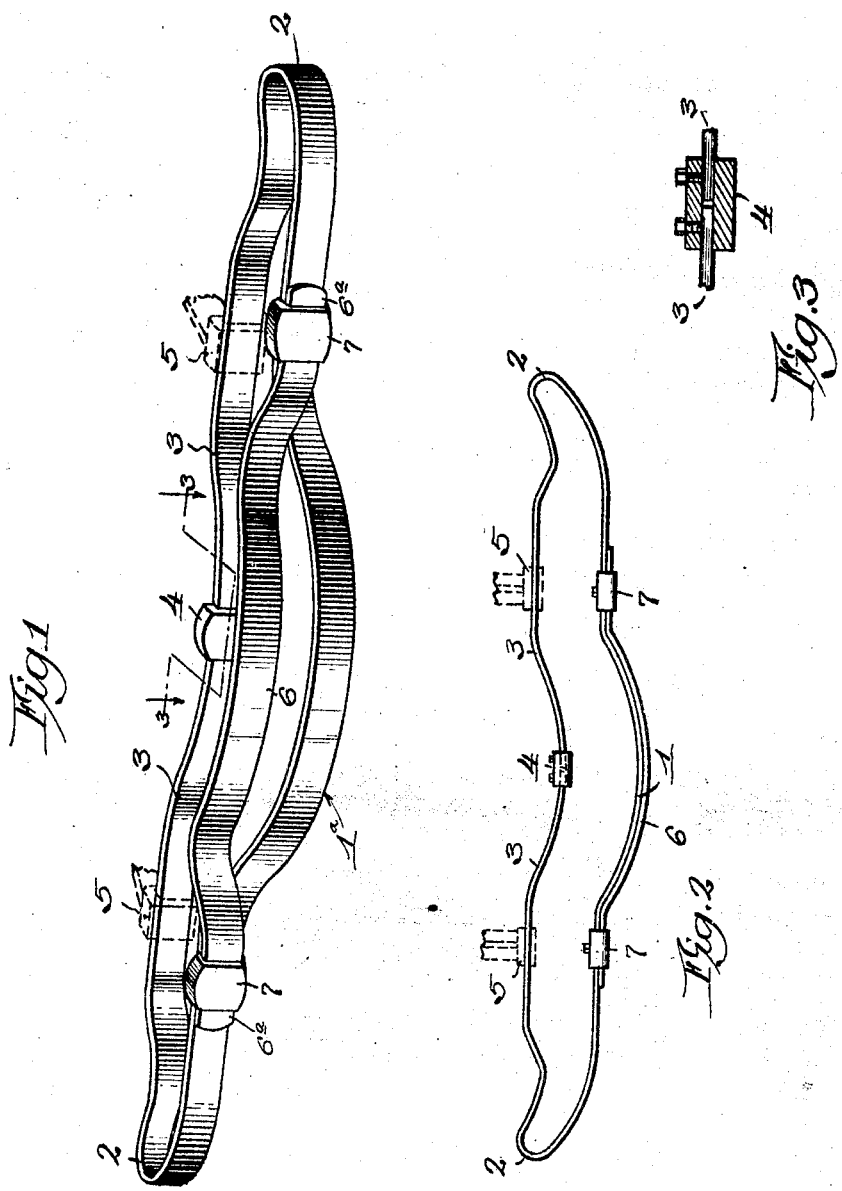
Witness:  
Chas R. Toursh.
Inventor,  
William J. Grotenhuis Patented Dec. 15, 1925.

1,565,273

UNITED STATES PATENT OFFICE.

WILLIAM J. GROTENHUIS, OF CHICAGO, ILLINOIS, ASSIGNOR TO BIFLEX PRODUCTS COMPANY, OF WAUKEGAN, ILLINOIS, A CORPORATION OF DELAWARE.

AUTOMOBILE BUMPER.

Application filed June 11, 1925. Serial No. 36,326.

*To all whom it may concern:*

Be it known that I, WILLIAM J. GROTENHUIS, a citizen of the United States of America, and a resident of Chicago, in the county of Cook and State of Illinois, have invented a certain new and useful Improvement in Automobile Bumpers, of which the following is a specification.

This invention relates to improvements in automobile bumpers and more particularly to bumpers of the resilient bar type and characterized by a widened impact area intermediate the ends of the impact section.

The object of the invention is to provide an improved construction for bumpers of the character described, calculated to increase the strength of the structure without increasing the weight or size of the stock used, and to otherwise afford greater protection against damage to the vehicle in the event of collision.

A preferred embodiment of the invention is disclosed in the accompanying drawings in which:

Figure 1 is a perspective view of the bumper;

Figure 2 is a top plan view of the bumper, and

Figure 3 is an enlarged detail view in section taken on line 3—3 of Figure 1.

The bumper herein disclosed is fabricated from flat bar stock of spring steel of about 2½ inches in width and ¼ inch in thickness, although the size of the stock may vary in different styles and weights of bumpers.

In its general aspect the bumper has the form of a resilient bar bent into a flat loop, extending across the front or rear of the automobile, with the face of the bar in a vertical plane and providing a forward impact member with narrow looped or U-shaped ends and a rear bar having direct connection with the frame of the automobile.

Thus, a single resilient bar 1, extends throughout the forward or impact section with its ends bent rearwardly and inwardly to form the looped or U-shaped ends 2, 2, and its end portions 3, 3, extended inwardly beyond the end loops, and joined at their ends by a clamp, thus forming a continuous reinforcing bar behind the front impact section. Engaging the rear bar at points between the central point thereof and the extremities of the bumper are the clamps 5, 5, forming parts of the attaching brackets connecting the bumper with the automobile frame.

Intermediate the ends of the impact section is an impact area of increased width, formed in part by a downwardly offset portion 1ª of the bar 1, and an auxiliary bar 6, having its end portions 6ª clamped flatwise to the bar 1, just beyond the offset portion by means of clamps 7, 7. The central portion of the auxiliary bar 6, is offset upwardly in the opposite direction from the corresponding offset portion of the main bar 1, the two offset portions forming parallel bar-sections spaced apart vertically one above the other.

Moreover, the forward or impact section of the bumper is bowed outwardly from end to end, as is apparent from Figure 2, but it is to be observed that the line of curvature is not uniform throughout, but is a combination of two arcs of different curvature, one being a relatively flat curve, which gives the bumper a slight rearward curvature at its ends, and the other shorter and a more pronounced curve, which is confined to the widened central portion of the impact section.

The curvature or bow is placed in the bars by subjecting them to distortion in a suitable bending die, whereby the bars assume a permanent flatwise curvature, in the same way that they assume a permanent edgewise offset prior to the assembly of the bars into bumper form, although the bars may also be placed under tension by initially shaping the main bar 1, so that in the final assembly the entire structure is placed under tension when pressure is applied to bring the rear ends of the bar into alignment for clamping.

Thus, it will be observed that the front impact member has a pronounced bow or forward curvature throughout the centrally widened impact portion, which is quite distinct from and independent of the general curvature through the impact member from end to end. This bow or curvature in the central portion has for its purpose the introduction of additional stiffness throughout the central portion of the bumper in resisting and absorbing severe impacts such as would occur in the event of a head-on collision with a stationary object or a moving vehicle. The advantage of this construction will be appreciated from the following:

Assuming that the vehicle encounters an obstruction, the result of the impact is to drive the front impact member rearwardly, thus tending to flatten the loop. Inasmuch as the bumper structure is fixed at points of attachment at 5—5, the distortion of the bumper under the force of the blow tends to throw the outer extremities in a forward direction as the central portion is driven rearwardly. If the blow is not too great, the resiliency of the structure is sufficient to cushion the force of the blow before the front impact member is driven against the rear bar and will resume its initial shape without permanent distortion. Similarly, if the blow is extremely severe the front impact member may be driven against the rear bar whereupon the curved portion will then flatten out, thus resisting the excess force of the blow, which otherwise would be transmitted to the frame of the vehicle.

For the purpose of still further strengthening the bumper, the central portion of the rear bar is also bowed forwardly with the same degree of curvature as the corresponding bowed portion of the impact section immediately in front. By reason of this complementary curve in the rear bar, the same resists in a proportionally greater degree the forces tending to distort it. This will be apparent when it is understood that a blow received against the central portion of the bumper tends to drive the front bar rearwardly, at the same time throwing the ends forwardly, thereby tending to distort the rear bar in a curve which the reverse of the permanent curvature thereof.

It follows therefore that the combination of the two complementary curves in front and rear sections of the bumper materially adds to the strength, as well as the appearance, of the bumper and offers increased resistance to permanent distortion under impact.

I claim as my invention:

1. An automobile bumper comprising a resilient bar bent to form front and rear sections and intermediate looped ends, the central portions of said front and rear sections being curved outwardly with respect to the end portions thereof.

2. An automobile bumper comprising resilient front and rear sections connected at their ends, and each having a portion intermediate its ends bowed forwardly.

3. An automobile bumper comprising a front impact section and a rear section, and consisting of a resilient bar bent in the form of a flat loop, said impact section having a portion intermediate its ends curved forwardly, and said rear section having a portion of like curvature immediately behind the curved portion of said impact section.

4. An automobile bumper comprising a front impact section and a rear section, and consisting of a resilient bar bent in the form of a flat loop, said sections having their central portions bowed forwardly by introducing pronounced curves in the bar throughout said portions.

5. An automobile bumper comprising a resilient bar bent to form an impact section, looped ends and a rear section, and adapted for attachment to an automobile at points disposed inwardly from the ends of said rear section, said impact section having a central portion of a pronounced forward curvature, and said rear section having a corresponding portion of like curvature intermediate said points of attachment.

6. An automobile bumper comprising front and rear sections spaced apart, and consisting of a resilient bar shaped to form a flat loop, said front section having a portion intermediate its ends, offset vertically and bowed forwardly with a pronounced curvature relative to the end portions thereof.

7. An automobile bumper comprising a resilient bar extending throughout the front impact section thereof, and having a widened impact portion intermediate its ends, consisting of a vertically offset portion of said bar, and an auxiliary bar secured at its ends to said first mentioned bar, said bars being curved forwardly throughout said widened portion.

8. An automobile bumper comprising a resilient bar extending throughout the front impact section thereof, and having a widened impact portion intermediate its ends, consisting of a vertically offset portion of said bar, and an auxiliary bar secured at its ends to said first mentioned bar, and having a corresponding vertically offset portion, said bars being further curved forwardly throughout the vertically offset portions thereof.

9. An automobile bumper comprising a resilient bar extending throughout the impact section thereof, and having its end portions bent rearwardly and inwardly to form looped ends, and a rear section with the extremities of the bar clamped together centrally thereof, said bar being vertically offset throughout the central portion of said impact section, an auxiliary bar clamped to said first mentioned bar and having a corresponding offset portion, said central portion of said impact section and a corresponding portion of said rear section being bowed in a forward direction by the introduction of a pronounced curve in the bars throughout said portions.

Signed at Chicago this sixth day of May, 1925.

WILLIAM J. GROTENHUIS.